(12) United States Patent
Ayoub et al.

(10) Patent No.: US 6,477,363 B1
(45) Date of Patent: Nov. 5, 2002

(54) SYSTEM AND METHOD FOR COMMUNICATING THE LOCATION OF AN EMERGENCY CALLER THROUGH A TELEPHONE NETWORK TO A CONTROL STATION

(76) Inventors: Mohamad Ayoub, 72 Stonehurst Blvd., Freehold, NJ (US) 07728; Ahmad Lamah, 124 Cypress Ct., Howell, NJ (US) 07731

( * ) Notice: Subject to any disclaimer, the term of this patent is extended or adjusted under 35 U.S.C. 154(b) by 0 days.

(21) Appl. No.: 09/345,598

(22) Filed: Jun. 29, 1999

(51) Int. Cl.$^7$ ............................................. H04M 11/00
(52) U.S. Cl. ....................... 455/404; 455/521; 455/456; 455/414
(58) Field of Search ................................ 455/404, 456, 455/457, 521, 414

(56) References Cited

U.S. PATENT DOCUMENTS

| | | | | |
|---|---|---|---|---|
| 5,388,147 A | * | 2/1995 | Grimes | 379/59 |
| 5,544,225 A | * | 8/1996 | Kennedy, III et al. | 379/59 |
| 5,835,907 A | * | 11/1998 | Newman | 707/10 |
| 5,873,040 A | * | 2/1999 | Dunn et al. | 455/456 |
| 5,890,068 A | * | 3/1999 | Fattouche et al. | 455/456 |
| 5,937,355 A | * | 8/1999 | Joong et al. | 455/466 |
| 5,982,868 A | * | 11/1999 | Shaffer et al. | 379/220 |
| 6,085,097 A | * | 7/2000 | Savery et al. | 455/456 |
| 6,198,914 B1 | * | 3/2001 | Saegusa | 455/456 |

\* cited by examiner

*Primary Examiner*—Edward F. Urban
*Assistant Examiner*—Marceau Milord

(57) ABSTRACT

A system and a method for communicating the location of an emergency caller through a telephone network use a mobile telephone set (1) having a location detection unit (12). The position data is translated into a stream of audio tones to be transmitted while the call connection is in progress. According to an alternative solution the position data is translated into one of a multitude of assigned telephone numbers to be transmitted during the setup phase of the call connection. The telephone numbers can be combined with the ID of the cell tower (21) the cellular phone (1) is communicating with. The invention combines well established techniques resulting in a cost efficient cellular emergency call service.

41 Claims, 2 Drawing Sheets

Figure 1:
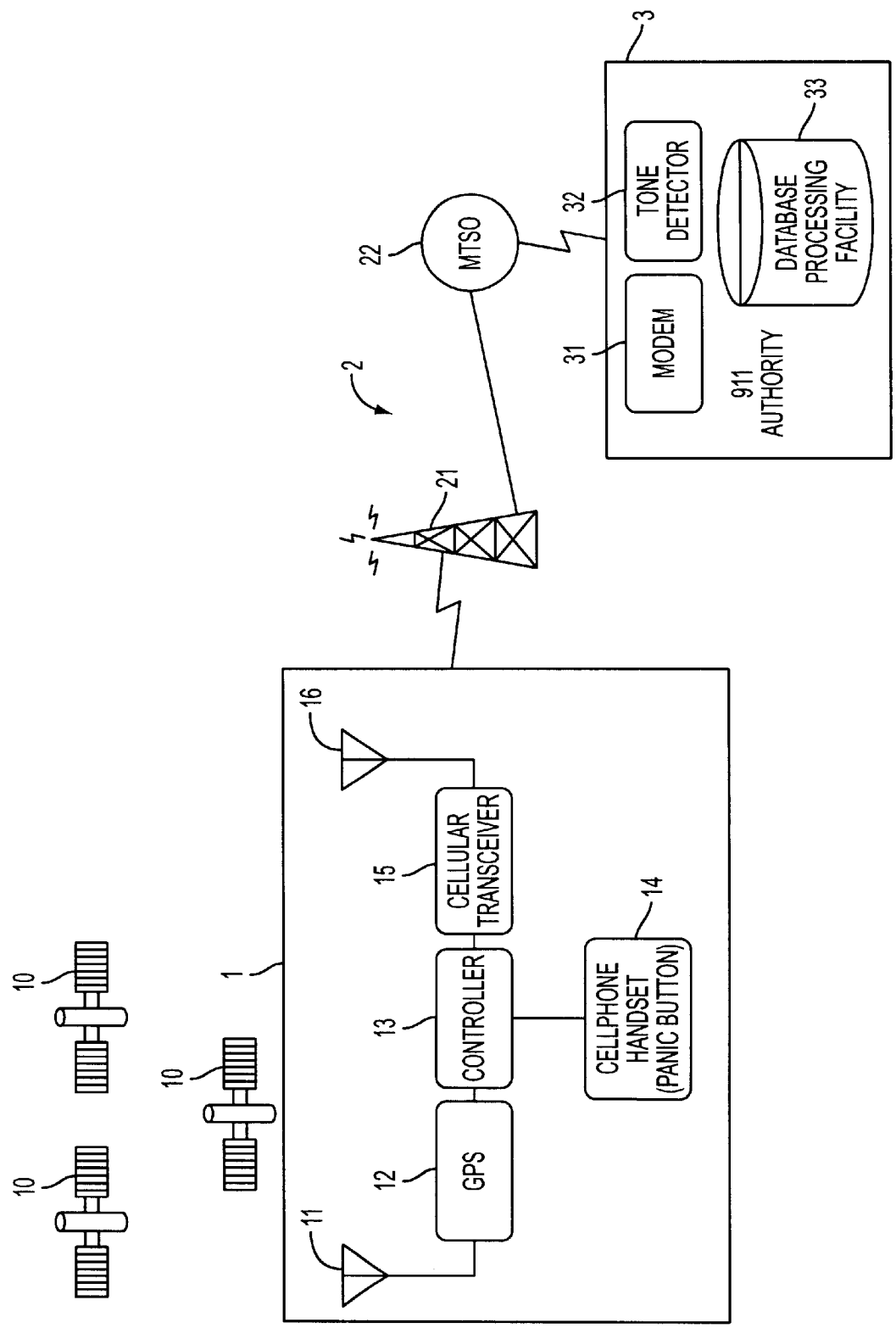

SYSTEM AND METHOD FOR COMMUNICATING THE LOCATION OF AN EMERGENCY CALLER THROUGH A TELEPHONE NETWORK TO A CONTROL STATION

The invention refers to a system and to a method for communicating the location of an emergency caller from a mobile telephone set through a telephone network to a control station which is handling the emergency call in which position data corresponding to the location of the mobile telephone set is obtained and transformed into a format to be transmitted to the control station.

According to federal regulation U.S. telephone network operators offering services for Public Answering Service Points must to provide ability to communicate the position of the calling party during an emergency call to the emergency authority, e.g. a police station. As long as the telephone set which a person in an emergency situation is calling from is connected to a wire based network, the telephone company operating the Public Answering Service Point already knows the fixed location of the calling party. In a wireless telephone network, however, the location of the calling party is not known to the networking company at sufficient accuracy. From Oct. 1, 2001 on federal regulation in the U.S. will require an accuracy of the location in the range of less than 125 meters using a root mean square methodology.

In U.S. Pat. No. 5,873,040 a wireless 911 emergency location system is disclosed where several mobile switching offices share a common database. In order to locate the caller the signal strength is measured at the base station communicating with the calling cellular phone. The measured value is passed with the switching offices to the shared computer to calculate the search area. A detailed mapping of the calculated area is provided to the emergency assistance center. The position of the caller is rather inaccurate.

European patent application no. EP-A1-0,897,119 teaches a cellular transmitter for automatically providing position location and emergency. The mobile telephone set comprises a GPS positioning device to provide the coordinates of the caller. A stored telephone number is transmitted to the switching office together with the position data.

In the co-pending U.S. patent application Ser. No. 09/022558 entitled "System and method for communicating information through a telephone network" filed Feb. 12, 1998, a system for communicating the position of a mobile object having a cellular transceiver is disclosed. The position data is transformed into one or more of a multitude of assigned telephone numbers. The telephone numbers represent the location information to be transmitted to a switch using the "callback" or "direct Inward dialing (DID)" service. The transmission of each DID is accomplished during the handshake when the calling telephone set is setting up the communication link to the switch as long as the connection is not yet fully established, which means that the switch is still "on hook". As a result communication charges are avoided. A set of DID telephone numbers is obtained from the telephone network operator on a rental basis for a fixed, e.g. monthly, fee.

The object of the invention is to provide a system for communicating the location of an emergency caller from a mobile telephone set through a telephone network to a control station handling the emergency call which can be easily implemented.

Another object of the invention is to provide a respective method for communicating the location of an emergency caller.

With respect to the system, the foregoing object is solved by a system for communicating the location of an emergency caller through a telephone network to a control station for handling the emergency call comprising a mobile telephone set; a location detection unit arranged in said mobile telephone set for obtaining position data of the location of said mobile telephone set: a transforming unit arranged in said mobile telephone set and coupled to said location detection unit for receiving said position data and for transforming said position data into a set of audio tones representing said position data; and a transceiving unit arranged in said mobile telephone set for transmitting said audio tones representing said position data through said telephone network when a call connection between said mobile telephone set and said control station is established;

and alternatively by a system for communicating the location of an emergency caller through a telephone network to a control station for handling the emergency call comprising a mobile telephone set; a location detection unit arranged in said mobile telephone set for obtaining position data of the location of said mobile telephone set; a transforming unit arranged in said mobile telephone set and coupled to said location detection unit for receiving said position data and for transforming said position data into one of a multitude of assigned telephone numbers representing said position data; and a transceiving unit arranged in said mobile telephone set for transmitting said one of said assigned telephone numbers through said telephone network when a call connection between said mobile telephone set and said control station is being set up.

With respect to the method, the foregoing object is solved by a method for communicating the location of an emergency caller from a mobile telephone set through a telephone network to a control station handling the emergency call comprising the steps of obtaining position data of the location of said mobile telephone set; transforming said position data into a set of audio tones representing said position data; and transmitting said audio tones representing said position data through said telephone network when a call connection between said mobile telephone set and said control station is established;

and alternatively by a method for communicating the location of an emergency caller from a mobile telephone set through a telephone network to a control station handling the emergency call comprising the steps of: obtaining position data of the location of said mobile telephone set; transforming said position data into one of a multitude of assigned telephone numbers representing said position data; and transmitting said one of said assigned telephone numbers through said telephone network when a call connection between said mobile telephone set and said control station is being set up.

In the preferred embodiment according to the first solution employing audio tones, the position data is translated into a set of DTMF tones. Each digit of the latitude and longitude of the obtained location of the mobile telephone set is converted into a DTMF tone. The tone is transmitted to the emergency authority, e.g. police station, while the call is in progress. In the event of transmission of the position data the stream of tones can be heard. However, the duration of the stream of tones is relatively short so that the interference with the voice call connection can be neglected.

The location can be captured at repetitive intervals and updated during the call connection through respective transmission of DTMF tone sequences. The receiving device located at the emergency authority requires a tone decoder that retrieves the DTMF sequence during the emergency call and translates it back to location information in the form of longitude and latitude.

In the preferred embodiment according to the second alternative solution employing telephone numbers the location is transmitted during the handshake or setup phase of the emergency call connection. When the calling party presses an emergency button or sequence of buttons, e.g. 911 in the U.S. or a corresponding number in other countries, the location of the mobile telephone set is captured and translated Into a telephone number format which is then transmitted to a switch of the network operating company. Preferably, the telephone numbers are DIDs. The switch recognizes the DID number as being reserved for an emergency call. As the DID number corresponds to a location, the emergency call can be routed to the responsible local emergency authority.

An individual DID corresponds to a predetermined area portion, all areas covering a continuous area of possible locations where emergency service is offered. An entire country can be covered by several of such continuous areas all using the same set of DID telephone numbers in parallel. The numbers are known to the central office switch which distributes the emergency call to the next local emergency authority according to the stored assignment. As an example, a set of 5,000 DIDs with each DID assigned to an area of 5 $km^2$ covers a continuous area of 25,000 $km^2$. Dividing the U.S. into areas of 25,000 $km^2$ all having the same set of DIDs the whole country can be served.

Alternatively. an identification number which is uniquely identifying the cell tower that governs the communication with the mobile telephone set can be transmitted to the central office switch in addition to the DID, A set of about 2,000 DIDs is sufficient to provide an accuracy of the location information which is even better than the federal regulation requirement.

In either embodiment, an automatic location Identification (ALI) system receiving the location information maps the location into environmental data stored at the ALI system. This data is sent to the emergency authority and displayed in order to facilitate handling of the emergency call.

The location information can be obtained in any known way. Preferably, a satellite based positioning system like Global Positioning System (GPS) is arranged in the mobile telephone set which obtains longitude and latitude of the current location of the calling party. Alternatively, a known cellular triangulation method can be used or the position of the mobile telephone set can be derived from the position of the cell tower.

The invention combines already known techniques as DTMF tone generation and decoding, direct inward dialing, ALI to provide an emergency call system based on mobile phones thereby enabling a cost efficient implementation of the system.

Figures 2, 3:
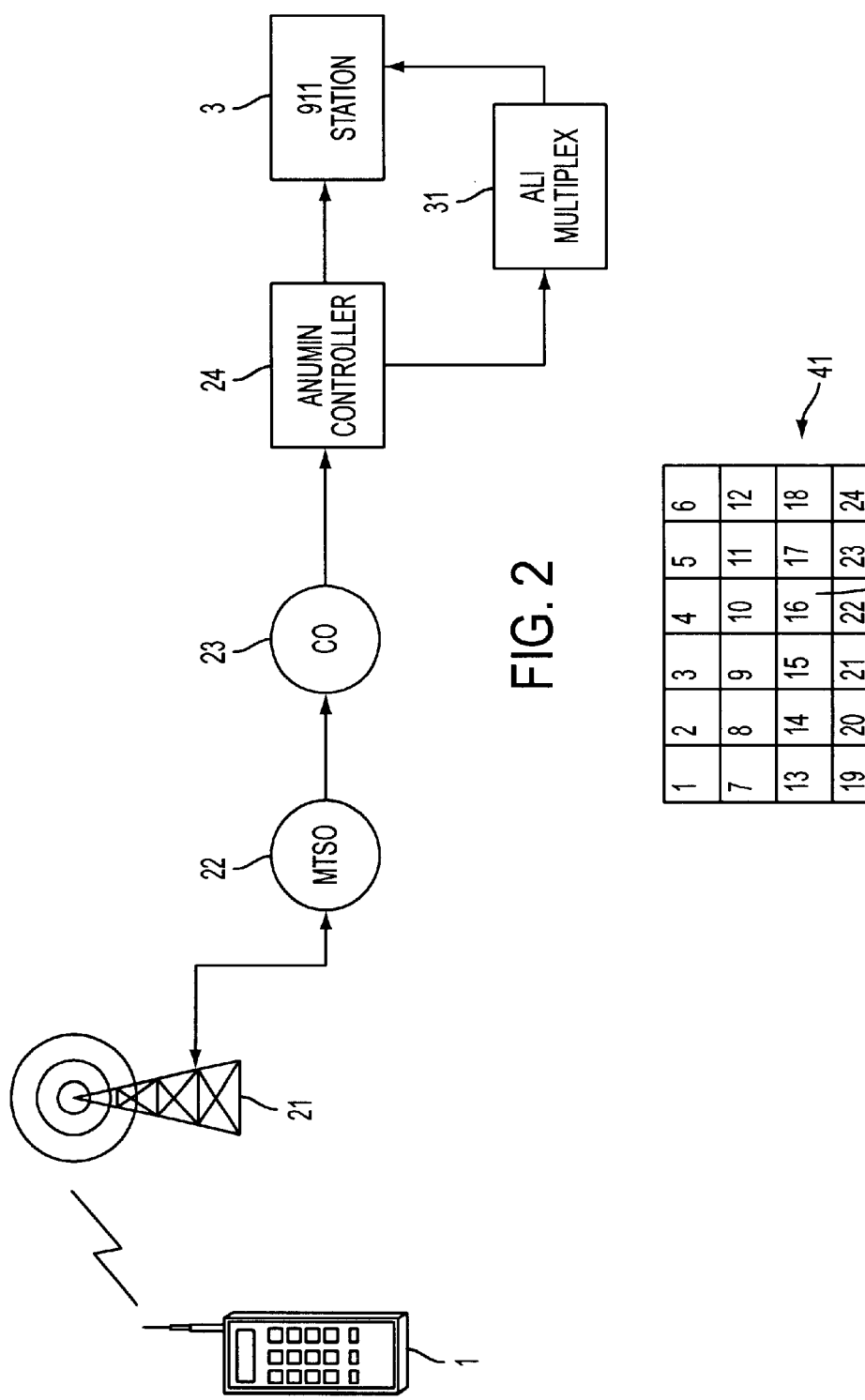

These and other features of the invention, the preferred embodiments and the advantages thereof will be presented in more detail in the following description, taken in connection with the accompanying drawings, in which:

FIG. 1 schematically shows a cellular network according to the first alternative of the invention;

FIG. 2 schematically shows a cellular network according to the second alternative of the invention; and FIG. 3 shows an example of an continuous area divided up into 30 area portions each assigned with a DID telephone number.

The system in FIG. 1 shows a mobile telephone set 1, e.g. a cellular phone, a cellular telephone network 2 comprising a cell tower 21 and a mobile telephone switch office (MTSO) 22, and an emergency authority 3, e.g. a police station. The mobile phone 1 has a built in means for obtaining its position. In the embodiment the means for obtaining a position is a receiver of a satellite based positioning system like Global Positioning System (GPS), satellites 10 being shown in the figure. But any other system of locating the cellular phone like triangulation would apply. The GPS receiver comprises a GPS antenna 11 which feeds the received signals from the satellites into a GPS module 12 calculating the position of the mobile telephone resulting in a data item for longitude and latitude, resp. The position data is acquired repetitively in constant time intervals, e.g. every five minutes, and is stored in a controller 13 together with a time stamp representing the time of position acquisition. When an emergency call is requested from handset module 14 by pressing 911 on the keypad or pressing a dedicated panic button, a transceiver 15 generates the emergency call and communicates via an antenna 16 through the cellular network to the authority 4.

When the communication between the mobile phone and the authority is established, the position is translated into audio tones which are transmitted through the voice channel of the telephone call connection. The audio tones uniquely represent longitude and latitude of the last captured position. The tones are generated by controller 13 and transmitted trough transceiver 15. The stream of tones may be of any coding. Preferably, the longitude and latitude are translated into a sequence of tones according to a dual tone multifrequency standard (DTMF) where a tone of a predetermined frequency corresponds to one digit. The tones are sent via the voice channel so that they can be heard by the caller. Since the stream of tones is rather short, the call connection is not disturbed significantly. Alternatively, the tones can be sent through the control channel during the setup of the call connection.

The switching office 22 receives the emergency call and passes it through to the emergency authority 3 along with the string of DTMF tones. The receiving equipment in the authority has a modem 31 and a tone detector 32 which extracts the DTMF tones and translates them back into digits which represent longitude and latitude of the position of the cellular phone 1. When the authority 3 receives the call, the DTMF tone detector and decoder 32 is connected to the computer of the telephone system of the authority 3. As the caller is communicating with the authority 3, the controller 13 in the cellular phone 1 sends the updated position at the constant interval while the emergency call is in progress.

The position is acquired using the GPS system. Alternatively, the position can be obtained in either known manner. Methods for obtaining the position applicable in the invention are cellular triangulation or a method using position data obtained from the cell towers the cellular phone is communicating with in order to fixate the location of the 911 caller. With either method, the position is translated into a stream of DTMF tones that represent longitude and latitude which are sent to the authority 3 while the voice call connection is in progress.

At the authority 3, the position data received from the DTMF decoder 32 is sent to a database processing facility 33 that combines the position data with data representing the environment of the position, like an automatic location identification (ALI) system. The database uses the position data and generates mapping information like street names, bridges, intersections, highways etc. The location of the caller can be displayed on a computer screen together with the mapping information. Most of the 911 dispatch offices or the police facilities are linked to an ALI system.

In the system in FIG. 2 like elements are designated with the same reference numbers. The components of the cellular phone 1 of FIG. 2 correspond to the respective components of cellular phone 1 shown in FIG. 1. When an emergency 911 call is made from cellular phone 1, its built-in GPS module acquires its position. Once a 911 call is made, the obtained position in the form of longitude and latitude is converted into a signal to be transmitted through the cellular network 2 to the emergency authority 3, e.g. a police station.

The system of FIG. 2 uses a phone number format for the position data. The phone numbers are telephone numbers according to the DID features which are used for sending calls only. They do not receive incoming calls. A set of DID numbers is obtained on a rental basis on a fixed fee. The DIDs are assigned by the North American Dialing Plan Commission to any phone company that meets certain criteria and regulatory issues.

Upon activation of the emergency call by typing 911 on the keypad of the handset or by pressing a panic button, the cellular phone generates the DID number that corresponds to the position obtained from the GPS module. The DID numbers are evaluated by the receiving equipment during the setup phase of the call, before a telephone call connection is fully established. The cell tower 21 passes the DID number to the mobile telephone switch office (MTSO) 22. The MTSO has a built-in database which contains all DID numbers that can represent a 911 call. The MTSO registers the call and passes it to the central office (CO) 23. The central office notices from its built-in database that the received DID represents a 911 call. The central office saves the DID and passes the call to a controller 24 which is able to perform automatic number identification (ANI) and/or evaluate the mobile identification number (MIN). The controller 24 passes the call to the emergency authority 3, e.g. a police station. As the DID represents the location of the caller, the MTSO, the CO and the ANI/MIN controller are able to pass the call to the proper 911 station 3 that is nearest to the emergency location and that can manage the emergency case best.

The controller 24 passes the call and the DID number to a database processing facility 31 that combines the position data with data representing the information like street names, bridges, intersections, highways etc. The location of the caller can be displayed on a computer screen together with the mapping information. Most of the 911 dispatch offices or the police facilities are linked to an ALI system. The information from the ALI system is sent to the 911 dispatch office 3 at their request. The dispatch office 3 can locate the emergency call and activate the proper authority to help the caller.

Each DID number represents an associated area portion of a predetermined, preferably equal size. As an example. FIG. 3 shows 30 areas. each associated to a different DID 1 . . . 30. When the controller 13 in the cellular phone 1 determines that the location of the caller is in a specific area (e.g. area 40), it translates the position data obtained in the form of longitude and latitude into the DID telephone number associated to that area portion (e.g. DID 16). Each one of said area portions is located adjacently to another one of said area portions so that all area portions form a continuous area 41 of possible locations for the mobile telephone set.

In the embodiment, the area portion represented by one DID telephone number is 5 km$^2$. The multitude of 5,000 DIDs can cover an continuous area of 25,000 km$^2$ which is almost the size of the state of New Jersey in the U.S. When an emergency call is made by a caller located in area 40, the controller 13 of the cellular phone 1 generates the associated DID 16 for area 40 and sends it to the cellular transceiver 16.

When the country to be covered by the system of the invention is divided up into a multitude of the above mentioned continuous areas each built-up by a multitude of area portions, the same set of DIDs can be used for each continuous area. In the embodiment, the US is divided into continuous areas of 25,000 km$^2$, each being composed of 5,000 area portions of 5,000 km$^2$ associated with an individual DID. When an emergency call is initiated, it is routed to the nearest 911 dispatch office via the central office. The 5,000 DIDs are stored in the database in each central office in the country. As soon as any central office receives one of the 5,000 DIDs, it sends it to the nearest 911 dispatch office. The 911 dispatch office is linked to the ALI system where all 5,000 DIDs are represented by their locations.

In an alternative embodiment employing DID numbers, each continuous area mapped into the set of DIDs is referenced to a cell tower the mobile phone is communicating with. Each cell tower has its unique Identification number (ID).

The ID can be its longitude and latitude of position, In case of an emergency call the GPS receiver or any other means of locating the cellular phone like triangulation obtains the position of the cellular phone and converts it into the DID that is associated to the area portion the cellular phone is located in. This DID is combined with the cell tower ID the cellular phone is communicating with. The combination of DID and cell tower ID is passed to the 911 dispatcher. For different cell towers the same set of DIDs can be used.

A cell tower may cover an area of 1,000 square miles. In this embodiment, an area portion of ½ square mile is associated with an individual DID. A set of 2,000 DIDs is sufficient to achieve enough accuracy of the locations in the area that is covered by a cell tower. The transmitted location information has an accuracy of less than 125 meters using root-mean-square according to the FCC mandate. Thus, an entire emergency service based on cellular phones can be provided using 2,000 DIDs within the cover area of the cellular network.

We claim:

1. A system for communicating the location of an emergency caller through a telephone network (2) to a control station (3) for handling the emergency call comprising:

a mobile telephone set (1);

a location detection unit (12) arranged in said mobile telephone set (1) for obtaining position data of the location of said mobile telephone set (1);

a transforming unit (13) arranged in said mobile telephone set (1) and coupled to said location detection unit (12) for receiving said position data and for encoding said position data into a set of audio tone representing said position data; and a transceiveing unit (15) arranged in said mobile telephone set (1) for transmitting said audio tones representing said position data through said telephone network (2) when a call connection between said mobile telephone set (1) and said control station (3) is established.

2. System according to claim 1, characterized in that said transforming unit (13) generates audio tones of different frequency representing said position data.

3. System according to claim 2, characterized in that said transforming unit (13) generates audio tones according to a dual tone multifrequency tone standard representing said position data.

4. System according to claim 3, characterized in that said transforming unit (13) generates a stream of tones representing the longitude of said location of said mobile telephone set (1) from said position data and a stream of tones representing the latitude of said location of said mobile telephone (1) set from said position data.

5. System according to claim 1, characterized in that said telephone network (2) passes said audio tones through a voice channel of said call connection between said mobile telephone set (1) and said control station.

6. System according to claim 1, characterized in that said telephone network (2) passes said audio tones through a control channel of said calf connection between said mobile telephone set (1) and said control station (3).

7. System according to claim 1, further comprising a switching office (22) for communicating with said mobile telephone set (1) and for passing said communication from said mobile telephone set (1) to said control station (3).

8. System according to claim 7, further comprising a database being accessible from said control station (3), said control station (3) being adapted to combine said position data with mapping information retrieved from said database in response to said position data.

9. System according to claim 1, characterized in that said location detection unit (12) obtains said position data of said mobile telephone set (1) in repetitive time intervals, in that said transforming unit (13) transforms said repetitively obtained position data into a respective set of audio tones, and in that said transceiver unit (15) transmits each said respective set of audio tones through said telephone network (2) to said control station (3).

10. System according to claim 1, further comprising an audio tone decoder (32) arranged in said control station (3) for receiving and decoding said transmitted audio tones to retrieve said position data.

11. System according to claim 1, characterized in that said location detection unit (12) is a receiver of a satellite based positioning system.

12. System according to claim 1, characterized in that said location detection unit (12) obtains said position data of said mobile telephone set (1) through cellular triangulation.

13. A method for communicating the location of an emergency caller from a mobile telephone set (1) through a telephone network (2) to a control station (3) handling the emergency call comprising the steps of:
  obtaining position data of the location of said mobile telephone set (1);
  encoding said position data into a set of audio tones representing said position data; and
  transmitting said audio tones representing said position data through said telephone network when a call connection between said mobile telephone set (1) and said control station (3) is established.

14. Method according to claim 13, characterized in that said step of transforming comprises generating audio tones of different frequency representing said position data.

15. Method according to claim 14, characterized in that said step of transforming further comprises generating audio tones according to a dual tone multifrequency tone standard representing said position data.

16. Method according to claim 15, characterized in that said step of transforming further comprises generating a stream of tones representing the longitude of said location of said mobile telephone set (1) from said position data and generating a stream of tones representing the latitude of said location of said mobile telephone set (1) from said position data.

17. Method according to claim 13, characterized in that said step of transmitting comprises passing said audio tones through a voice channel of said call connection between said mobile telephone set (1) and said control station (3).

18. Method according to claim 13, characterized in that said step of transmitting comprises passing said audio tones through a control channel of said call connection between said mobile telephone set (1) and said control station (3).

19. Method according to claim 14, further comprising the step of accessing a database by said control station (3) and combining said position data with mapping information retrieved from said database in response to said position data.

20. Method according to claim 13, characterized in that said step of obtaining comprises obtaining said position data of said mobile telephone set (1) at repetitive time intervals, in that said step of transforming comprises transforming said repetitively obtained position data into a respective set of audio tones, and in that said step of transmitting comprises transmitting each said respective set of audio tones through said telephone network (2) to said control station (3).

21. Method according to claim 13, further comprising the step of receiving and decoding said transmitted audio tones to retrieve said position data.

22. Method according to claim 13, characterized in that said step of obtaining comprises obtaining said position data through receiving signals from a satellite based positioning system.

23. Method according to claim 13, characterized in that said step of obtaining comprises obtaining said position data through cellular triangulation.

24. A system for communicating the location of an emergency caller through a telephone network (2) to a control station (3) for handling the emergency call comprising:
  a mobile telephone set (1);
  a location detection unit (12) arranged in said mobile telephone set (1) for obtaining position data of the location of said mobile telephone set (1);
  a transforming unit (13) arranged in said mobile telephone set (1) and coupled to said location detection unit (12) for receiving said position data and for transforming said position data into one of a multitude of assigned telephone numbers representing said position data; and
  a transceiving unit (15) arranged in said mobile telephone set (1) for transmitting said one of said assigned telephone numbers through said telephone network (2) when a call connection between said mobile telephone set (1) and said control station (3) is being set up.

25. System according to claim 24, further comprising a means (14) for starting said emergency call arranged in said mobile telephone set (1), said means (14) causing said one of said assigned telephone numbers to be sent through said telephone network (2) upon operating it (14).

26. System according to claim 24, further comprising at least one switching office (22, 23) for communicating with said mobile telephone set (1), said switching office (22, 23) receiving said one of said assigned telephone numbers, each telephone number corresponding to one of a multitude of control stations (3), said switching office (22, 23) passing a call connection from said mobile telephone set (1) to the respective control station (3) corresponding to said one of said multitude of telephone numbers.

27. System according to claim 26, further comprising a unit for automatic location identification (31) mapping said one of said multitude of assigned telephone numbers into environment data stored at said unit for automatic location identification (31).

28. System according to claim 24, characterized in that each of said multitude of assigned telephone numbers corresponds to an area portion (40) of a predetermined size, one of said area portions (40) being located adjacently to another one of said area portions, all area portions forming a continuous area (41) of possible locations for said mobile telephone set (1), said transforming unit (13) evaluating said position data to determine in which one of said multitude of area portions said mobile telephone set (1) is located and transforming said position data into the respective one of said multitude of assigned telephone numbers which corresponds to the determined area portion (40).

29. System according to claim 26, further comprising a cell tower for communicating with said mobile telephone set (1), a unique identification signature corresponding to said cell tower (21), said cell tower (21) transmitting said identification signature upon passing said emergency call to said control station (3).

30. System according to claim 29, characterized in that said cell tower (21) is associated to one of a multitude of control stations, said switching office (22, 23) passes said emergency call to said associated one of said multitude of control stations (3).

31. System according to claim 24, characterized in that said location detection unit (12) is a receiver of a satellite based positioning system.

32. System according to claim 24, characterized in that said location detection (12) unit obtains said position data of said mobile telephone set (1) through cellular triangulation.

33. A method for communicating the location of an emergency caller from a mobile telephone set (1) through a telephone network (2) to a control station (3) handling the emergency call comprising the steps of:

obtaining position data of the location of said mobile telephone set (1);

transforming said position data into one of a multitude of assigned telephone numbers representing said position data; and transmitting said one of said assigned telephone numbers through said telephone network (2) when a call connection between said mobile telephone set (1) and said control station (3) is being set up.

34. Method according to claim 33, further comprising the step of causing to transmit said one of said assigned telephone numbers through said telephone network (2) upon operating a means (14) for starting said emergency call.

35. Method according to claim 33, characterized in that each telephone number corresponds to one of a multitude of control stations (3), said step of transmitting comprises passing a call connection from said mobile telephone set (1) to the respective control station (3) corresponding to said one of said multitude of telephone numbers.

36. Method according to claim 35, further comprising the step of mapping said one of said multitude of assigned telephone numbers into environment data stored at a unit for automatic location identification (31).

37. Method according to claim 33, characterized in that each of said multitude of assigned telephone numbers corresponds to an area portion (40) of a predetermined size, one of said area portions (40) being located adjacently to another one of said area portions, all area portions forming a continuous area (41) of possible locations for said mobile telephone set (1), whereby said step of transforming comprises evaluating said position data to determine in which one of said multitude of area portions (40) said mobile telephone set (1) is located and transforming said position data into the respective one of said multitude of assigned telephone numbers which corresponds to the determined area portion (40).

38. Method according to claim 35, characterized in that said step of transmitting comprises transmitting the emergency call through a cell tower (21) communicating with said mobile telephone set (1), whereby a unique identification signature corresponds to said cell tower (21), and transmitting said identification signature upon passing said emergency call to said control station (3).

39. Method according to claim 38, characterized in that said cell tower (21) is associated to one of a multitude of control stations (3) and in that said step of transmitting comprises passing said emergency call to said associated one of said multitude of control stations (3).

40. Method according to claim 33, characterized in that said step of obtaining comprises obtaining said position data through receiving signals from a satellite based positioning system.

41. Method according to claim 33, characterized in that said step of obtaining comprises obtaining said position data through cellular triangulation.

\* \* \* \* \*